(12) United States Patent    (10) Patent No.: US 8,818,715 B2
Mahapatro et al.    (45) Date of Patent: Aug. 26, 2014

(54) SYSTEMS AND METHODS TO SUGGEST TRAVEL ITINERARIES BASED ON USERS' CURRENT LOCATION

(75) Inventors: Arun Mahapatro, Nagar (IN); Anshul Sao, Bangalore (IN); Matt Klein, Cupertino, CA (US); Guy Hepworth, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 112 days.

(21) Appl. No.: 13/434,074

(22) Filed: Mar. 29, 2012

(65) Prior Publication Data

US 2013/0261957 A1    Oct. 3, 2013

(51) Int. Cl.
*G01C 21/00*    (2006.01)
*G08G 1/123*    (2006.01)

(52) U.S. Cl.
USPC ...................................... 701/426; 340/995.24

(58) Field of Classification Search
USPC ............. 701/426, 436, 437, 438; 340/995.24, 340/995.19
See application file for complete search history.

(56) References Cited

U.S. PATENT DOCUMENTS

| | | | |
|---|---|---|---|
| 8,082,186 B2 | 12/2011 | Schuchman et al. | |
| 2006/0089788 A1* | 4/2006 | Laverty | 701/202 |
| 2006/0200309 A1 | 9/2006 | Yu et al. | |
| 2008/0268876 A1* | 10/2008 | Gelfand et al. | 455/457 |
| 2009/0143977 A1 | 6/2009 | Beletski et al. | |
| 2011/0202267 A1 | 8/2011 | Amer-Yahia et al. | |
| 2011/0301835 A1 | 12/2011 | Bongiorno | |
| 2012/0064919 A1* | 3/2012 | Purdy | 455/456.3 |

OTHER PUBLICATIONS

Chekuri et al. (A Recursive Greedy Algorithm for Walks in Directed Graphs, Proceedings of the 2005 46th Annual IEEE Symposium on Foundations of Computer Science (FOCS'05), 2005, IEEE).*
International Search Report (PCT/US2013/030429) dated Jun. 24, 2013, 3 pages.

* cited by examiner

*Primary Examiner* — Muhammad Shafi
(74) *Attorney, Agent, or Firm* — James J. DeCarlo; Greenberg Traurig, LLP

(57) ABSTRACT

Data relating to points-of-interest for a geographical area are retrieved from, for example, a travel site. Geo-tagged data relating to the points-of-interest are retrieved, for example, images from an image sharing service. Travel times between the points-of-interest are determined, for example, using a mapping service. The data relating to the points of interest, the geo-tagged data and the travel times are used to create a travel graph for the geographical area, such that the geo-tagged data is used to determine time users spend at specific points of interest. If a user requests a travel itinerary for a beginning and ending location within the geographical area, the travel graph is used to create a travel itinerary that maximizes a prize score for the itinerary within a time constraint. The prize score can reflect the popularity, number of users and time spent by users at the points-of-interest in the itinerary.

20 Claims, 6 Drawing Sheets

SYSTEMS AND METHODS TO SUGGEST TRAVEL ITINERARIES BASED ON USERS' CURRENT LOCATION

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE DISCLOSURE

The present disclosure relates to systems and methods for suggesting travel itineraries to users and more particularly for systems and methods for suggesting travel itineraries to users based on the user's current location, final destination and time in hand, as well as the popularity and travel time between various places of interest.

BACKGROUND

Users frequently travel with geo-aware mobile devices that can also take photographs. Such photographs and their corresponding location can give insight into the level of interest users have in various points of interest that can, in turn be used to, among other things, suggest travel itineraries.

BRIEF DESCRIPTION OF THE DRAWINGS

The foregoing and other objects, features, and advantages of the disclosed systems and methods will be apparent from the following more particular description of preferred embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
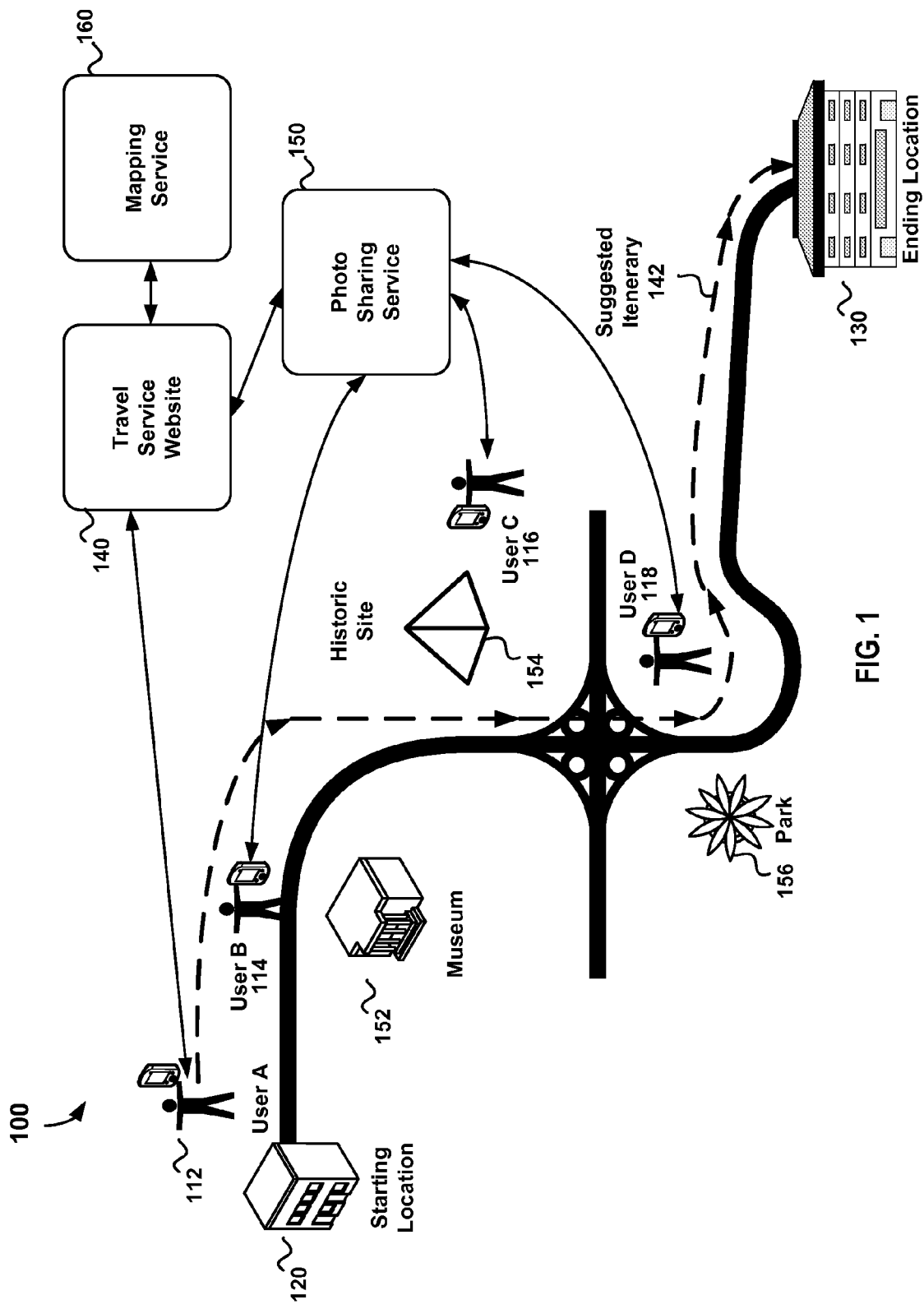
FIG. 1 is a high-level conceptual overview of systems and methods for suggesting travel itineraries to users according to some embodiments of the present disclosure.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended.

Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

The Detailed Description is not intended as an extensive or detailed discussion of known concepts, and as such, details that are known generally to those of ordinary skill in the relevant art may have been omitted or may be handled in summary fashion.

The systems and methods to which this disclosure relates are described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, For the purposes of this disclosure, a computer-readable medium stores computer data, which data can include computer program code that is executable by a computer, in machine-readable form. By way of example, and not limitation, a computer-readable medium may comprise computer-readable storage media, for tangible or fixed storage of data, or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media includes, but is not limited to, RAM (random access memory), ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

In various embodiments, the presently disclosed systems and methods provide services to suggest travel itineraries to users based on users current location, their final destination, time in hand, and popularity and driving time of places of interests in the users' vicinity.

FIG. 1 is a high-level illustration of basic concepts underlying various embodiments of the present disclosure.

In the illustrated embodiment, user A 112 is visiting an area 100 and is traveling between a starting location 120 and an ending location 130. User A is generally unfamiliar with the area 100, and so user A 112 accesses an Internet accessible travel service 140, for example, utilizing a mobile device, and requests a travel itinerary to travel from the starting location 120 to the ending location 130.

In an embodiment, the travel service 140 determines various potential points of interest in the area 100 utilizing a number of different data sources. In an embodiment, such data could include ratings posted by users 114, 116 and 118 of various sites of interest the users have visited such as, for example, museums 152, historic sites 154 and/or parks 156. In an embodiment, such data could also include photos posted to a photo sharing service 150 by the users 114, 116 and 118 of the various points of interest 152, 154 and 156. Photos can provide additional insight into a site's overall popularity and interest, for example, the number of photos related to a site is a measure of the site's interest. Photos can also give a measure of how long users spend at a site, which provides an additional measure of a site's interest.

In an embodiment, the travel service 140, utilizing mapping data provided by a mapping service 160, determines one or more suggested travel itineraries 142 through the area 100 that optimizes, among other things, travel time and the number of points of interest 152, 154 and 156 that the travel itinerary includes. The travel service then provides the suggested travel itineraries 142 to user A 112, for example, as a map or list displayed on the user's mobile device.

Figure 2:
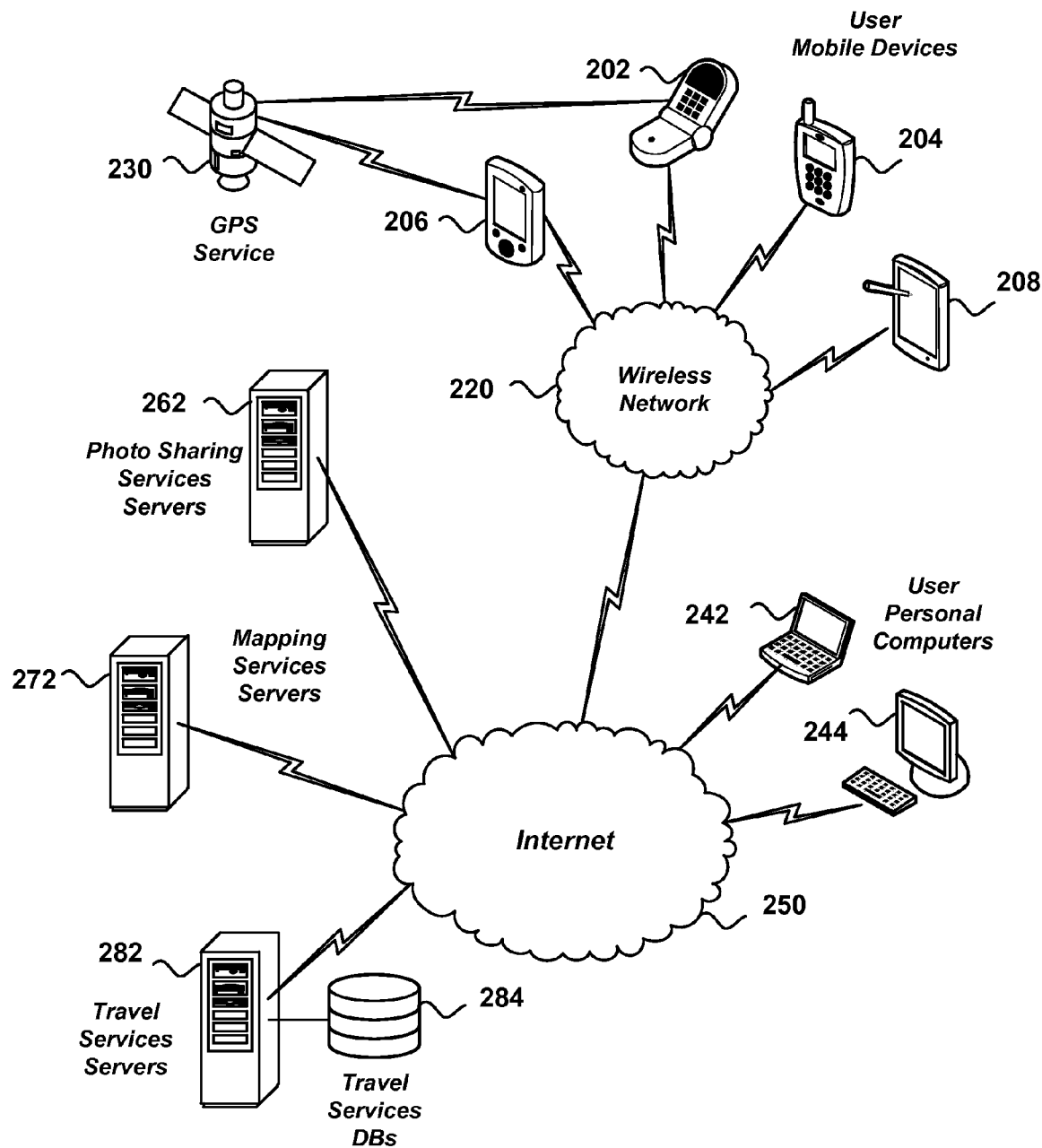
FIG. 2 is a schematic diagram illustrating an example network according to some embodiments of the present disclosure.

In an embodiment, as described in greater detail below, the travel service pre-computes one or more graphs of points of interest and routes through the area 100 that it utilizes in combination with a user's starting 120 and ending location 130 to determine a suggested itinerary 142 on a real-time or near-time basis FIG. 2 is a schematic diagram illustrating an example embodiment of a network within which the systems and methods disclosed herein could be implemented. Other embodiments that may vary, for example, in terms of arrangement or in terms of type of components, are also intended to be included within claimed subject matter.

As shown, FIG. 2, for example, includes a variety of networks, such as a wide area network (WAN) such as the Internet 250 and wireless network 220. FIG. 2 additionally includes a variety user devices, such as user personal computers 242 and 244 and user mobile devices, such as cell phones 202, smart phones 204, PDAs 206 and tablet computers 208. FIG. 2 additionally includes a variety of servers, such as image sharing servers 262, mapping services servers 272 and travel services servers 282 that provide, in various embodiments, image sharing websites and web services, mapping websites and web services and travel services websites and web services.

User devices 202, 204, 206, 208, 242 and 244 may include or may execute a variety of operating systems, including a personal computer operating system, such as a Windows, iOS or Linux, or a mobile operating system, such as iOS, Android, or Windows Mobile, or the like. A user device 202, 204, 206, 208, 242 and 244 may include or may execute a variety of possible applications such as a client software application enabling communication with other devices, such as communicating one or more messages, such as via email, short message service (SMS), or multimedia message service (MMS), including via a network, such as a social network or photo sharing services, including, for example, FACEBOOK, LINKEDIN, TWITTER, FLICKR, or GOOGLE+, to provide only a few possible examples.

In various embodiments, user mobile devices 202, 204, 206, 208 interface with one or more wireless networks 220. A wireless network 220 may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless 220 network may further employ a plurality of network access technologies, including Long Term Evolution (LTE), WLAN, Wireless Router (WR) mesh, or 2nd, 3rd or 4th generation (2G, 3G, or 4G) cellular technology, or the like. Network access technologies may enable wide area coverage for devices, such as client devices with varying degrees of mobility, for example.

For example, a network 220 may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like. In various embodiments, user mobile devices 202, 204, 206, 208 may additionally interface with one or more GPS services 230 for real-time positioning information.

Servers 262, 272 and 282 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In an embodiment, users are able to access services provided by the image-sharing servers 262, mapping services servers 272 and travel services servers 282 via the Internet 250 using their various devices 202, 204, 206, 208, 242 and 244. Among other activities users may engage in via the Internet can include posting photos to photo sharing websites hosted by the photo sharing servers 262 and accessing travel services websites and web services hosted by the travel services servers 282, for example, to rate points of interest or to request travel itineraries. In an embodiment, travel services hosted by the travel services servers 282 store various types of travel-related data, such as one or more graphs of points of interest and routes through various areas, in a travel services DBs 284.

Figure 3:
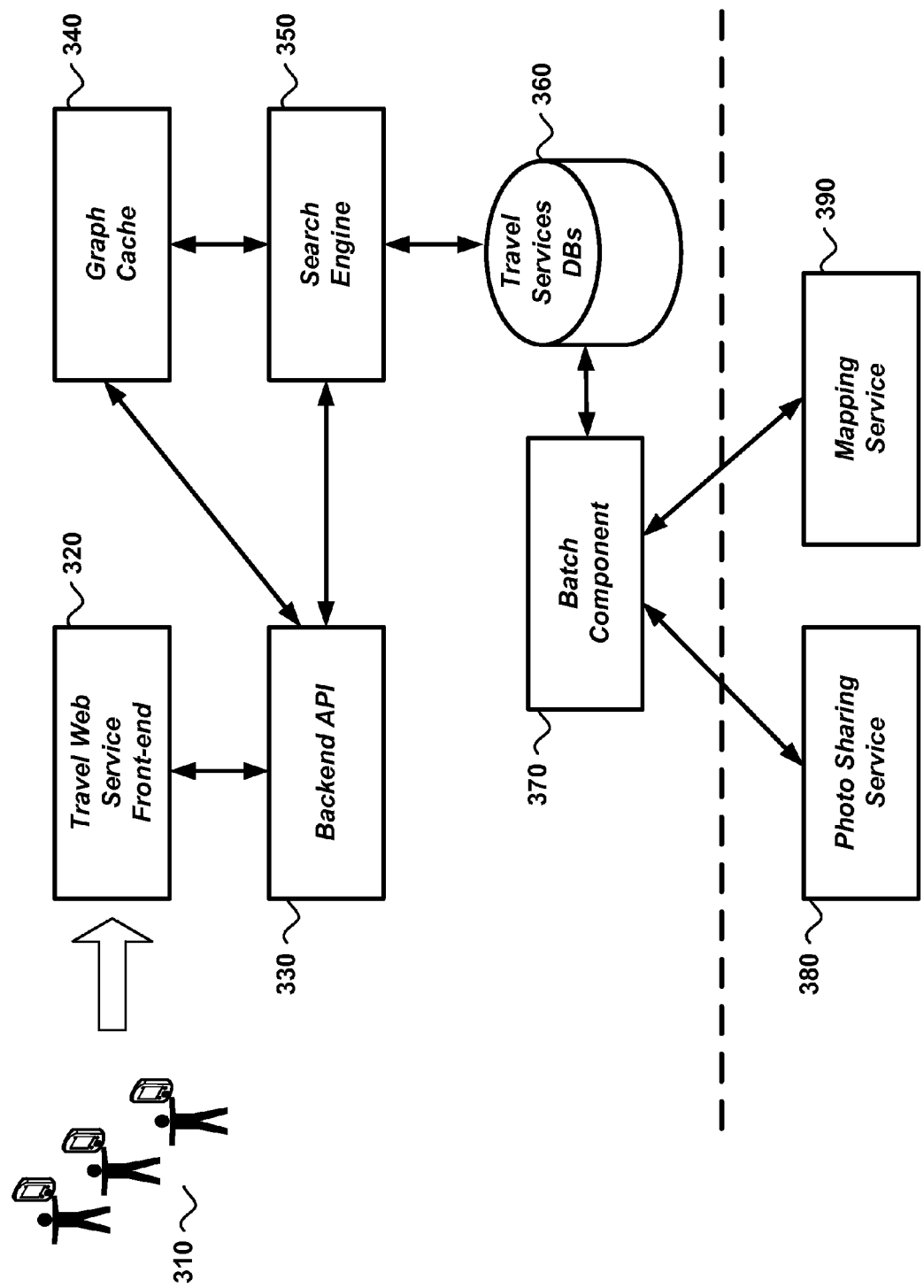
FIG. 3 is a schematic diagram illustrating an implementation of travel web services on one or more travel services servers according to some embodiments of the present disclosure.

FIG. 3 is a schematic diagram illustrating an example embodiment of an implementation of travel web services on one or more travel services servers such as shown in 282 of FIG. 2. In an embodiment, users 310 access a travel web services via the Internet using a travel web service front-end 320 via the Internet, for example, using their respective mobile devices. In an embodiment, the travel web service front-end 320 is a website, although any user interface that allows a user to send and retrieve data over a network could be used, for example, via email.

In an embodiment, the users 310 request travel itineraries and provide the travel web service front-end 320 with a beginning location and an end location and may additionally provide the amount of time available to the users as well as actual start and end times for the travel itineraries. In various embodiments, the users 310 beginning location is set, by default, as the user's current physical location which could be determined, for example, by determining the location of the user's 310 mobile device via GPS, triangulation or other conventional technique.

In an embodiment, travel web service front-end 320 then calls a backend API 330 that retrieves a pre-computed graph of users' 310 location from a graph cache 340. If the pre-computed graph of the users' 310 location is not in the cache 340, the backend API 330 utilizes a graph search engine 350, for example, VESPA, to search for a pre-computed graph of the users' 310 location in the travel services databases 360. If such a graph is found, it is loaded to cache. The pre-computed graph of the users' 310 location is then utilized to create travel itineraries for the users 310, which are returned to the users 310 on a real-time or near-time basis.

In the illustrated embodiment, pre-computed graphs for multiple locations are built by a batch component 370 as described in greater detail below. In an embodiment, the batch component is offline from the users' 320 perspective, which is to say, graphs are not built in response to users' requests, but are rather, periodically built in anticipation of future use. In an embodiment, the batch component 370 utilizes data from travel services databases 360, for example, user ratings of points of interest, photo sharing services 380, for example, user photos of points of interest and mapping services 390. In an embodiment, the photo sharing service 380 and the mapping service 390 are hosted on the same server as the travel services 320-370. In an embodiment, the photo sharing service 380 and the mapping service 390 are hosted on different servers and may be provided by different service providers.

Figure 4:
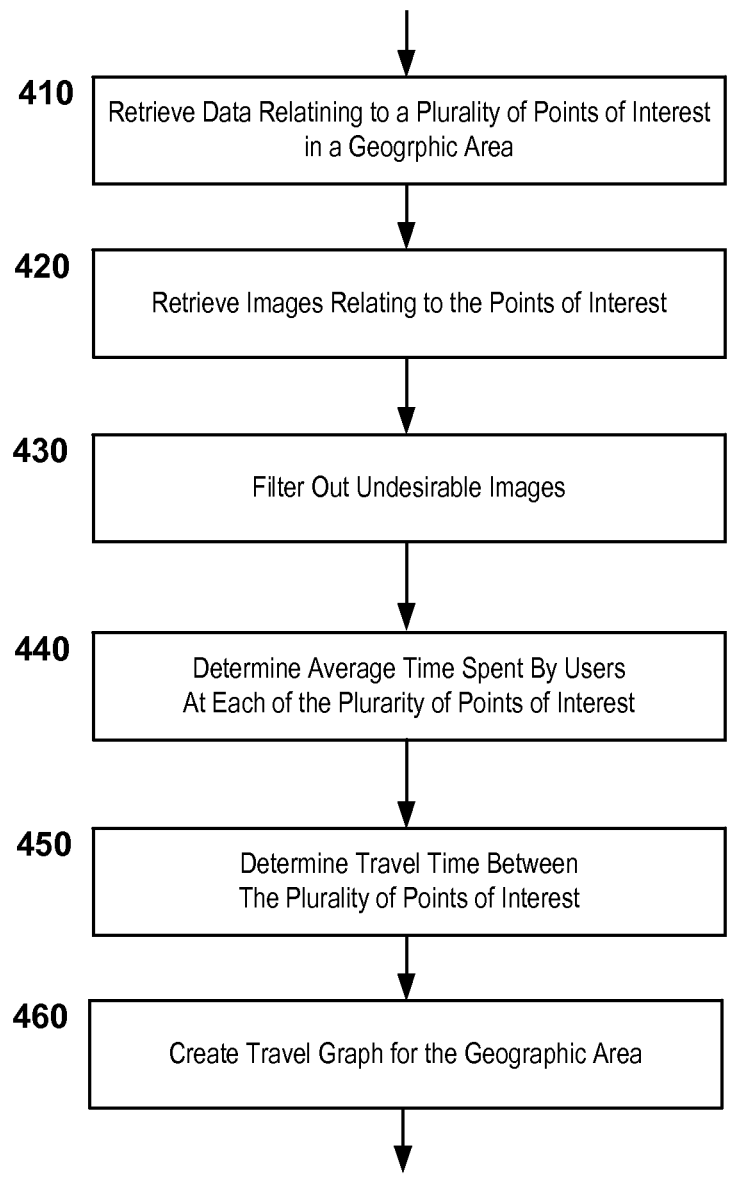
FIG. 4 illustrates a process for generating travel graphs for various locations according to some embodiments of the present disclosure.

FIG. 4 illustrates an embodiment 400 of a computer-implemented process for generating travel graphs for various locations. Unless otherwise specified, it should be understood that the processing described with respect to each of the blocks of FIG. 4 is performed by at least one computing device maintained or controlled by a travel service provider. In an embodiment, such a computing device could be one or more of the travel service servers 282 of FIG. 2 and the processing described is performed by a batch component such as, for example, the batch component 370 of FIG. 3. In an embodiment, various travel related data used and/or generated by the process 400 are stored on one or more databases such as, for example, the travel services DBs 284 of FIG. 2.

In block 410 of the process, data relating to a plurality of points of interest for a geographical area are retrieved using a computing device. In various embodiments, the geographical area could represent a city, a county, a state or a country known to have one or more points of interest. In an embodiment, the plurality of points of interest represent the most popular points-of-interest for the geographical area on a travel website or a social networking website.

For example, a point-of-interest's popularity could be determined by the number of "likes" for the point-of-interest on a social networking website or the number of positive ratings for the point-of-interest on a travel website. In an embodiment, the data relating to the plurality of points of interest could include, for example, address, GPS position, popularity, zip code and so forth.

In block 420 of the process, a plurality of images are retrieved using the computing device from an image source, each of the plurality of images relating to one respective point-of-interest of the plurality of points of interest and further relating to a respective one user of a plurality of users. In an embodiment, the image source is a photo-sharing website such as FLICKR and the images are retrieved using an API provided by the photo-sharing website, for example, by querying photo-sharing website for images related to a specific point-of-interest and/or a city. In an embodiment, the images are retrieved in reverse-chronological order (e.g. newest first). In an embodiment, each image of the plurality of images is further associated with a user ID, for example, a respective user ID of a user that uploaded each respective image to the image data source. In an embodiment, each image of the plurality of images is further associated with image related data which may include, for example, a geographical position associated with the image (e.g. a GPS position of the device capturing the image), and/or a date and time, for example, the date and time the image was captured.

Note that while in the illustrated embodiment, images are utilized for determining the time users spend at points-of-interest, in various embodiments, any type of geo-tagged objects that can be associated with a point-of-interest, a geographical position and a user could be used. For example, geo-tagged objects could comprise FACEBOOK PLACE checkins, FOUR SQUARE/GOOGLE LATITUDE checkins, TWITTER TWEETs and FACEBOOK status updates from mobile devices. Note that in various embodiments, association of a geo-tagged object with a point-of-interest could be based on any data within a geo-tagged object such as, for example, data explicitly referring to the point-of-interest or, additionally or alternatively, a geographical position that is within a short, predetermined distance (e.g. <0.1 kilometers) from the point-of-interest.

In block 430 of the process, the plurality of images is filtered using the computing device, such that images having undesirable characteristics are discarded. In various embodiments, such undesirable characteristics may include, without limitation:
  Images having a geographical position that appear to be in error.

Images from users that post too few images during a given time period and/or at a given point-of-interest.

Images from users that post too many images during a given time period and/or at a given point-of-interest.

Images from users appear to be residents of the geographical area to which images relate.

Images from users appear not to be residents of the geographical area to which images relate.

Various filtration techniques that could be utilized, alone or in any combination, are as follows. In an embodiment, a respective geographical location associated with each image of the plurality of images is verified such that if the respective geographical location is not within a threshold distance, for example, 5 kilometers, of the respective point-of-interest of the plurality of interests to which the image relates, the respective image is discarded.

In another embodiment, additionally or alternatively, the plurality of images are sorted and grouped by the respective user ID associated with the respective image and the respective date and time associated with the respective image. If a respective number of images for a respective user ID and a respective date is not greater than a threshold number of images, the respective images of the plurality of images associated with the respective date and the respective user ID are discarded.

In another embodiment, additionally or alternatively, images of the plurality of images that are associated with users that appear to be residents of the geographical area are discarded. In an embodiment, such residency can be determined directly by retrieving user profile data from the data source for each respective user ID associated with each image of the plurality of images. Where a respective user ID relates to a user who lives in or near the geographical area (e.g. within 50 kilometers), all the respective images for the respective user ID are discarded.

In another embodiment, residency can be inferred, additionally or alternatively, indirectly. In various embodiments, the plurality of images are sorted and grouped by the respective user ID associated with the respective image and the respective date and time associated with the respective image. In an embodiment, where a number images associated with a given user ID and the geographical area exceeds a threshold number of images, there is a high probability the user ID is that of a resident, and the respective images associated with the user ID are discarded. In another embodiment, additionally or alternatively, where a total number of days spent by a respective user ID in the geographical location exceed a threshold number, the respective images associated with the user ID are discarded.

In another embodiment, additionally or alternatively, images of the plurality of images that are associated with users that appear to not be residents of the geographical area are discarded. In an embodiment, such residency can be determined directly by retrieving user profile data from the data source for each respective user ID associated with each image of the plurality of images. Where a respective user ID relates to a user who does not live in or near the geographical area (e.g. within 50 kilometers), all the respective images for the respective user ID are discarded.

In an embodiment, additionally or alternatively, images of the plurality of images that appear to relate to aberrant or distorted data are discarded. In various embodiments, the plurality of images are sorted and grouped by the respective user ID associated with the respective image and the respective date and time associated with the respective image. In an embodiment, where a time span between a respective date and time of an earliest respective image of the plurality of images associated with a respective user and a respective point-of-interest and a respective date and time of a latest respective image associated with the respective user and the respective point-of-interest is less than a minimum threshold, for example, 3 minutes the respective images associated with the respective user and a respective point-of-interest are discarded.

In an embodiment, where a time span between a respective date and time of an earliest respective image of the plurality of images associated with a respective user and a respective point-of-interest and a respective date and time of a latest respective image associated with the respective user and the respective point-of-interest is less than a minimum threshold, for example, 3 minutes the respective images associated with the respective user and a respective point-of-interest are discarded.

In block 440 of the process, a respective average time spent by users at each respective point-of-interest of the plurality of points of interest is determined using the plurality of images. In an embodiment, the average time spent by users at a given point-of-interest is calculated by dividing the total time spent by all users at the respective point-of-interest by the total number of users visiting that location. In an embodiment, the time spent by a given user at a given point-of-interest is determined by a subtracting a respective date and time of an earliest respective image of the plurality of images associated with a respective user and a respective point-of-interest and a respective date and time of a latest respective image associated with the respective user and the respective point-of-interest In block 450 of the process, a plurality of travel time are determined, using the computing device, each respective travel time of the plurality of travel times comprising a travel time between a respective first one point-of-interest of the plurality of points-of-interest and a respective second one point-of-interest of the plurality of points-of-interest. In an embodiment, the plurality of travel times relate to all combinations of a respective two points-of-interest of plurality of points-of-interest.

In an embodiment, each respective travel time of the plurality of travel times is determined by issuing a mapping query, using the computing device, to a mapping service, where the mapping query comprises the respective addresses of the respective first and second points of interest. Where addresses are not available for points of interest, the respective travel time is determined by issuing a mapping query, using the computing device, to a mapping service, where the mapping query comprises the respective geospatial positions of the respective first and second points of interest.

In block 460 of the process, a travel graph for the geographical location is created for the geographical location, using the computing device, based on the data relating to the plurality of points of interest, the respective average time spent by users at each respective point-of-interest and the plurality of travel times. In an embodiment, the travel graph comprises a plurality of nodes, each respective node corresponding to a respective one point-of-interest of the plurality of points of interest In an embodiment, each respective node of the plurality of nodes of is associated with respective node level data, which can include, among other things:

A location, expressed as an address and/or geospatial coordinates.

Travel times between the respective node and all (or most) other nodes.

A respective popularity score for the node.

A respective number of users visiting the node.

A respective average time spent by users at the respective node.

In an embodiment, travel graph for the geographic location is stored, using the computing device, to a travel services database for future retrieval and user. In an embodiment, the travel graph creation process 500 is executed for a plurality of geographic locations, either serially and/or in parallel, and a plurality of travel graphs are created for the plurality of geographic locations and stored in a travel services database.

Figure 5:
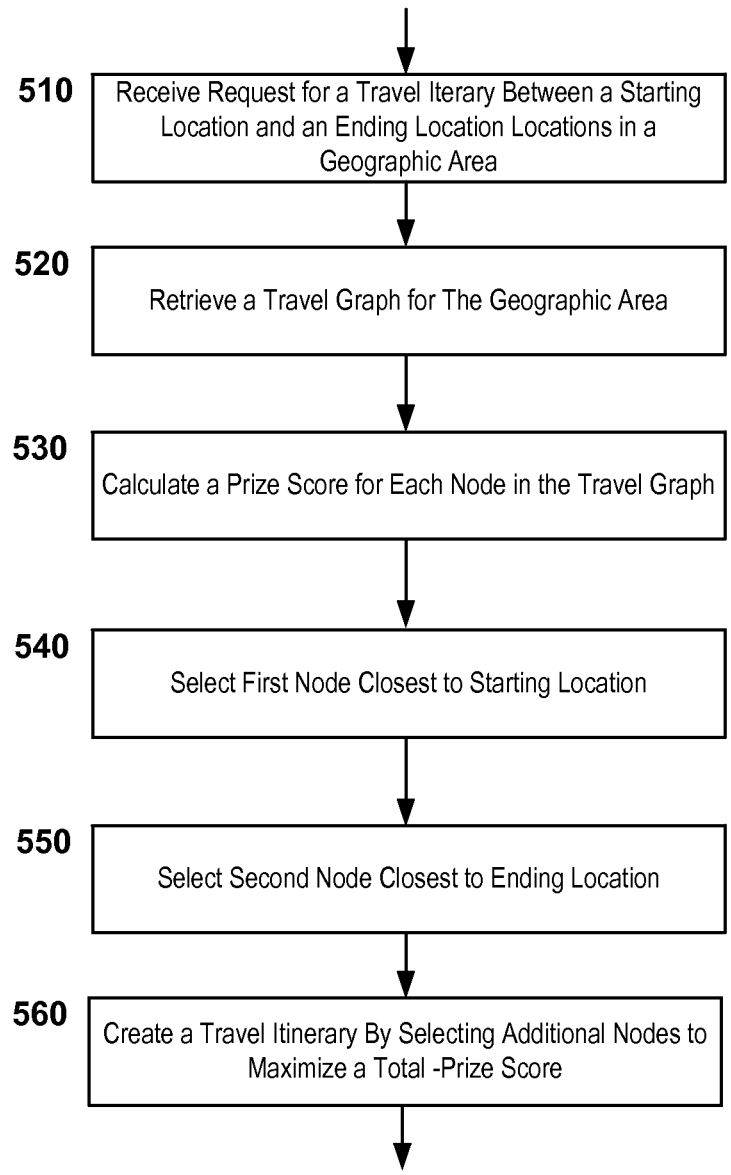
FIG. 5 illustrates a process for generating optimized travel itineraries for users utilizing travel graphs of various geographic locations according to some embodiments of the present disclosure.

FIG. 5 illustrates an embodiment 500 of a computer-implemented process for generating optimized travel itineraries for users utilizing travel graphs of various geographic locations. Unless otherwise specified, it should be understood that the processing described with respect to each of the blocks of FIG. 5 is performed by at least one computing device maintained or controlled by a travel service provider. In an embodiment, such a computing device could be one or more of the travel service servers 282 of FIG. 2 and the processing described is performed by various components executing on the travel service servers 282, for example, the travel web service front-end 320, the backend API 330, the graph cache 340 and the search engine 350 of FIG. 3. In an embodiment, various travel related data used and/or generated by the process 500 are stored on one or more databases such as, for example, the travel services DBs 284 of FIG. 2.

In block 510 of the process, a request for a travel itinerary is received, using a computing device, from a user device, the request comprising a starting location and an ending location and a time constraint. In various embodiments the starting and ending locations could be represented in any conventional manner such as, for example, street addresses, latitude and longitude and/or GPS coordinates. In various embodiments, the time constraint comprises the amount of time the user has available. In various embodiments, the time constraint additionally or alternatively comprise actual start and end times for the desired itinerary.

The request may be received via any conventional means such as, for example, via a user interface on a travel services website or via a messaging service such as, for example, mail or text messaging services. In an embodiment, the starting and ending locations are manually entered by a requesting user on the user device. In an embodiment, the requesting user only supplies the ending location, and the starting location is set to the current location of the user device. In an embodiment, the current location of the user device is determined using any conventional technique known in the art, for example, via GPS or triangulation of the user's device.

In block 520 of the process, a travel graph for a geographical area is retrieved, using a computing device, using the starting location and the ending location, such that the starting location and the ending location fall within the geographical area. In an embodiment, the travel graph for the geographical area is similar to, or identical to, the travel graphs created by the process 400 shown in FIG. 4 and discussed in detail above.

In an embodiment, the travel graph for the geographical area comprises a plurality of nodes, each respective node corresponding to a respective one point-of-interest of a plurality of points of interest in the geographical area. In an embodiment, each respective node of the plurality of nodes of is associated with respective node level data, which can include, among other things:

A location, expressed as an address and/or geospatial coordinates.

Travel times between the respective node and all (or most) other nodes.

A respective popularity score for the node.

A respective number of users visiting the node.

A respective average time spent by users at the respective node.

In block 530 of the process, a respective prize score is calculated, using the computing, device, for each node of the plurality of nodes. In an embodiment, the respective prize score is calculated using a formula that takes into account one or more of:

A respective popularity score for the node.

A respective number of users visiting the node.

A respective average time spent by users at the respective node.

In an embodiment, the respective prize score for each node of the plurality of node is calculated using a formula of the form:

(Popularity score of the node)*(Number of users visiting node)*(Average time spent by users in minutes visiting the node)/100.

In block 540 of the process, a first node of the plurality of nodes is selected, using the computing device, that is nearest to the starting location. In block 550 of the process, a second node of the plurality of nodes is selected, using the computing device, that is nearest to the ending location. In various embodiments, the selection of the first and second nodes of the plurality of nodes may additionally be based on the respective popularity of each respective node of the plurality of nodes. For example, if multiple nodes are approximately the same distance to the starting or ending locations, for example, no more than +/−0.1 kilometers, the most popular node will be selected.

In block 560 of the process, a travel itinerary is determined, using the computing device, using the travel graph and the respective prize scores for each of the plurality of nodes, such that the travel itinerary comprises the first node of the plurality of nodes, the second node of the plurality of nodes and a plurality of additional nodes selected from the plurality of nodes. In an embodiment, the plurality of additional nodes are selected from the plurality of nodes such that a total prize score for the plurality of additional nodes is maximized within the time constraint.

In an embodiment, the plurality of additional nodes are selected using a recursive greedy algorithm. In an embodiment, the recursive greedy algorithm is adapted to work with open travel graphs, where travel times are not known for all nodes. In an embodiment, the recursive greedy algorithm identifies shortest paths between nodes, and may, in some embodiments, utilize Dijkstra's algorithm in some of its internal computations. In an embodiment, the recursive greedy algorithm additionally provides a maximum number of nodes in any computed path as a system default.

In an embodiment, one or more nodes may be ignored based on the time constraint. For example, if a given point-of-interest is closed given the time of day implied by the time constraint, the node associated with that time of day is ignored.

In block 570 of the process, a representation of the travel itinerary provided, using the computing device, to the user device, for example, a map with highlights.

Figure 6:
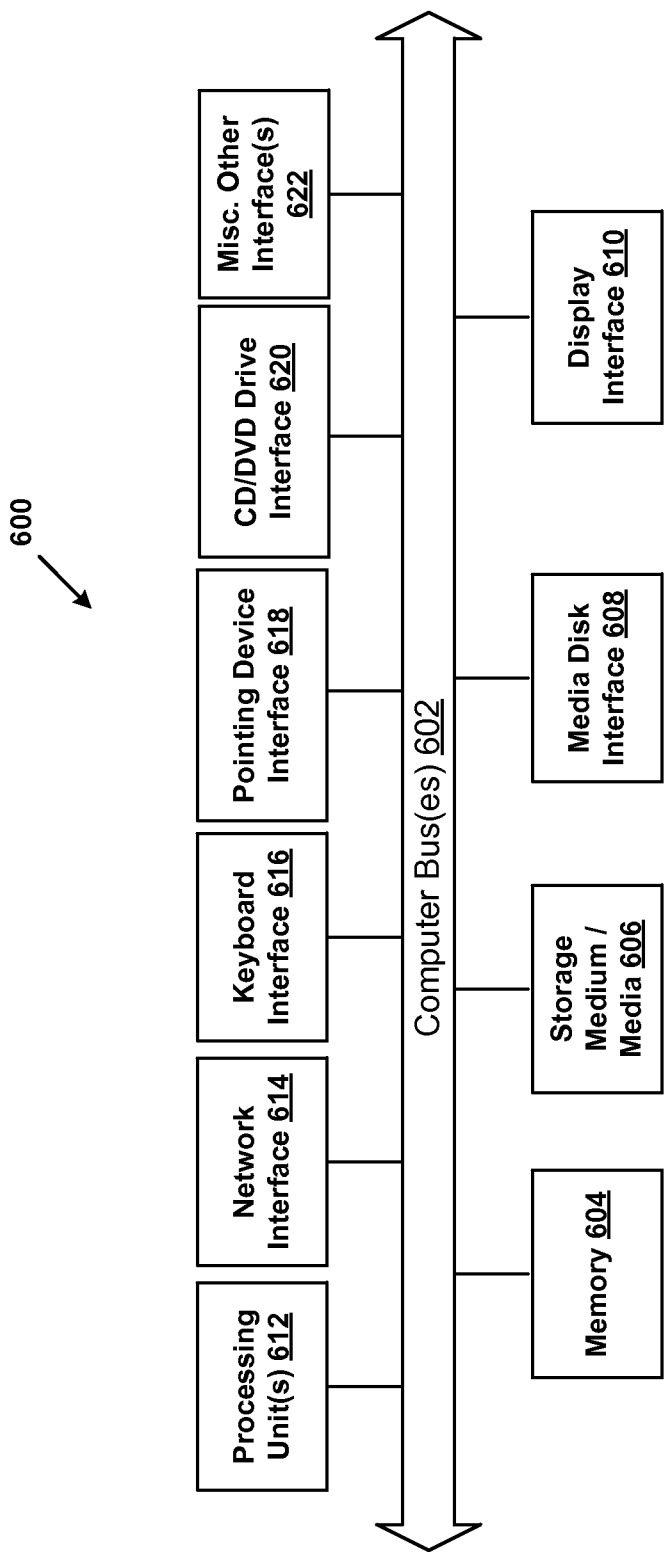
FIG. 6 is a block diagram illustrating an internal architecture of a computing device according to some embodiments of the present disclosure.

FIG. 6 is a block diagram illustrating an internal architecture of an example of a computing device. In an embodiment, FIG. 6 could represent the internal architecture of servers supporting the components of a travel service system such as shown in FIG. 2 in accordance with one or more embodiments of the present disclosure.

As shown in the example of FIG. 6, internal architecture 600 includes one or more processing units (also referred to herein as CPUs) 612, which interface with at least one computer bus 602. Also interfacing with computer bus 602 are persistent storage medium/media 606, network interface 614, memory 604, e.g., RAM, run-time transient memory, read only memory (ROM), etc., media disk drive interface 608 as an interface for a drive that can read and/or write to media including removable media such as floppy, CD-ROM, DVD, etc. media, display interface 610 as interface for a monitor or other display device, keyboard interface 616 as interface for a keyboard, pointing device interface 618 as an interface for a mouse or other pointing device, and miscellaneous other interfaces not shown individually, such as parallel and serial port interfaces, a universal serial bus (USB) interface, and the like.

Memory 604 interfaces with computer bus 602 so as to provide information stored in memory 604 to CPU 612 during execution of software programs such as an operating system, application programs, device drivers, and software modules that could comprise program code that, when executed by CPU 612, perform the processing described with respect to the blocks of FIGS. 4 and 5 above. CPU 612 first loads computer-executable process steps from storage, e.g., memory 604, storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving, using a computing device, from a user device, a request for a travel itinerary, the request comprising a starting location and an ending location within a geographic area and a time constraint;
   retrieving, using the computing device, a travel graph for the geographic area, the travel graph comprising a plurality of nodes, each respective node corresponding to a respective one point-of-interest of a plurality of points of interest, where each respective node of the plurality of nodes is associated with respective node level data comprising a respective location, a plurality of travel times between the respective node and at least a subset of the plurality of nodes, a respective popularity score for the node, a respective number of users visiting the node and a respective average time spent by users at the respective node;
   calculating, using the computing device, respective prize score for each node of the plurality of nodes;
   selecting, using the computing device, a first node of the plurality of nodes that is nearest to the starting location;
   selecting, using the computing device, a second node of the plurality of nodes that is nearest to the ending location;
   determining, using the computing device, a travel itinerary using the travel graph and the respective prize scores for each of the plurality of nodes, such that the travel itinerary comprises the first node of the plurality of nodes, the second node of the plurality of nodes and a plurality of additional nodes selected from the plurality of nodes, where the plurality of additional nodes are selected from the plurality of nodes such that a total prize score for the plurality of additional nodes is maximized within the time constraint; and
   communicating, using the computing device, a representation of the travel itinerary to the user device.

2. The method of claim 1, wherein the respective prize scores for each of the plurality of nodes is determined using the respective popularity score for the node, the respective number of users visiting the node and the respective average time spent by users at the respective node.

3. The method of claim 2, wherein the respective prize scores for each of the plurality of nodes is determined utilizing an algorithm of the form:
   (the respective popularity score of the node)*
   (the respective number of users visiting node)*
   (the respective average time spent by users in minutes visiting the node)/100.

4. The method of claim 1 wherein the plurality of additional nodes are selected using a recursive greedy algorithm.

5. The method of claim 4 wherein the recursive greedy algorithm identifies shortest paths between nodes.

6. The method of claim 1 wherein the time constraint reflects a time available to the user and a desired start time and a desired end time.

7. A method comprising:
   retrieving, using a computing device, point-of-interest data relating to a plurality of points of interest within a geographic area, the point-of-interest data comprising, for each point-of-interest of the plurality of points of interest, a respective popularity score and a respective location;
   retrieving, using the computing device, geo-tagged data comprising a plurality of geo-tagged objects, each geo-tagged object of the plurality of geo-tagged objects relating to a respective one point-of-interest of the plurality of points of interest and comprising a respective date and time and a respective one user of a plurality of users;

determining, using the computing device, using the geo-tagged data, for each point-of-interest of the plurality of points of interest, a respective average time spent by the plurality of users at the respective point-of-interest;

determining, using the computing device, a plurality of travel times, each respective travel time of the plurality of travel times comprising a travel time between a respective first one point-of-interest of the plurality of points-of-interest and a respective second one point-of-interest of the plurality of points-of-interest; and creating, using the computing device, a travel graph for the geographical location based on the point-of-interest data, the respective average time spent by the plurality of users at each respective point-of-interest and the plurality of travel times, such that the travel graph comprises a plurality of nodes, each respective node corresponding to a respective one point-of-interest of the plurality of points of interest, where each respective node of the plurality of nodes is associated with respective node level data, comprising a respective location, a plurality of travel times between the respective node and at least a subset of the plurality of nodes, a respective popularity score for the node, a respective number of users visiting the node and a respective average time spent by users at the respective node.

8. The method of claim 7,
where the respective average time spent by users at the respective point-of-interest is calculated by dividing a respective total time spent by the plurality of users at the respective point-of-interest by a respective total number of users visiting the respective point-of-interest,
where, for each user of the plurality of users visiting the respective point-of-interest, the respective time spent by the respective user is determined by time is determined by a subtracting a respective date and time of an earliest respective geo-tagged object of the plurality of geo-tagged objects associated with a respective user and a respective point-of-interest and a respective date and time of a latest respective geo-tagged object associated with the respective user and the respective point-of-interest.

9. The method of claim 7, further comprising:
filtering, using the computing device, the plurality of geo-tagged objects utilizing a filtration technique, such that a subset of the plurality of geo-tagged objects are discarded.

10. The method of claim 9, wherein the filtration technique comprises verifying the respective location associated with each geo-tagged object of the plurality of geo-tagged objects such that where the respective location is not within a threshold distance of the respective point-of-interest of the plurality of interests to which the geo-tagged object relates, the respective geo-tagged object is discarded.

11. The method of claim 9, wherein the filtration technique comprises, determining, for each user of the plurality of users, a respective number of geo-tagged objects for the respective user and a respective date, such that where the respective number of geo-tagged objects for the respective user and a respective date is not greater than a threshold number of geo-tagged objects, the respective geo-tagged objects of the plurality of geo-tagged objects associated with the respective date and the respective user ID are discarded.

12. The method of claim 9, wherein the filtration technique comprises, determining, for each user of the plurality of users, if the respective user is a resident of the geographical area, such that where the respective user of the plurality of users is a resident of the geographic area, the respective geo-tagged objects associated with the respective user.

13. The method of claim 9, wherein the filtration technique comprises, determining, for each user of the plurality of users, a respective time span between a respective date and time of an earliest respective geo-tagged object of the plurality of geo-tagged objects associated with a respective user and a respective point-of-interest and a respective date and time of a latest respective geo-tagged object associated with the respective user and the respective point-of-interest, such that where the respective time span is less than a minimum threshold, the respective geo-tagged objects associated with the respective user and a respective point-of-interest are discarded.

14. The method of claim 7, wherein the plurality of points of interest relate to a fixed number of most popular points of interest on a website.

15. The method of claim 7, wherein the plurality of travel times are determined utilizing a mapping service.

16. The method of claim 7 wherein each of the plurality of geo-tagged objects is an image.

17. A non-transitory computer readable storage media for tangibly storing thereon computer readable instructions for a method comprising:
receiving from a user device, a request for a travel itinerary, the request comprising a starting location and an ending location within a geographic area and a time constraint;
retrieving a travel graph for the geographic area, the travel graph comprising a plurality of nodes, each respective node corresponding to a respective one point-of-interest of a plurality of points of interest, where each respective node of the plurality of nodes is associated with respective node level data comprising a respective location, a plurality of travel times between the respective node and at least a subset of the plurality of nodes, a respective popularity score for the node, a respective number of users visiting the node and a respective average time spent by users at the respective node;
calculating respective prize score for each node of the plurality of nodes;
selecting a first node of the plurality of nodes that is nearest to the starting location;
selecting a second node of the plurality of nodes that is nearest to the ending location;
determining a travel itinerary using the travel graph and the respective prize scores for each of the plurality of nodes, such that the travel itinerary comprises the first node of the plurality of nodes, the second node of the plurality of nodes and a plurality of additional nodes selected from the plurality of nodes, where the plurality of additional nodes are selected from the plurality of nodes such that a total prize score for the plurality of additional nodes is maximized within the time constraint; and
communicating a representation of the travel itinerary to the user device.

18. A non-transitory computer readable storage media for tangibly storing thereon computer readable instructions for a method comprising:
retrieving point-of-interest data relating to a plurality of points of interest within a geographic area, the point-of-interest data comprising, for each point-of-interest of the plurality of points of interest, a respective popularity score and a respective location;
retrieving geo-tagged data comprising a plurality of geo-tagged objects, each geo-tagged object of the plurality of geo-tagged objects relating to a respective one point-ofinterest of the plurality of points of interest and comprising a respective date and time and a respective one user of a plurality of users;

determining using the geo-tagged data, for each point-of-interest of the plurality of points of interest, a respective average time spent by the plurality of users at the respective point-of-interest;

determining a plurality of travel times, each respective travel time of the plurality of travel times comprising a travel time between a respective first one point-of-interest of the plurality of points-of-interest and a respective second one point-of-interest of the plurality of points-of-interest; and creating a travel graph for the geographical location based on the point-of-interest data, the respective average time spent by the plurality of users at each respective point-of-interest and the plurality of travel times, such that the travel graph comprises a plurality of nodes, each respective node corresponding to a respective one point-of-interest of the plurality of points of interest, where each respective node of the plurality of nodes is associated with respective node level data, comprising a respective location, a plurality of travel times between the respective node and at least a subset of the plurality of nodes, a respective popularity score for the node, a respective number of users visiting the node and a respective average time spent by users at the respective node.

19. A computing device comprising:

a processor;

a storage medium for tangibly storing thereon program logic for execution by the processor, the program logic comprising:

logic executed by the processor for logic executed by the processor for receiving from a user device, a request for a travel itinerary, the request comprising a starting location and an ending location within a geographic area and a time constraint;

logic executed by the processor for retrieving a travel graph for the geographic area, the travel graph comprising a plurality of nodes, each respective node corresponding to a respective one point-of-interest of a plurality of points of interest, where each respective node of the plurality of nodes is associated with respective node level data comprising a respective location, a plurality of travel times between the respective node and at least a subset of the plurality of nodes, a respective popularity score for the node, a respective number of users visiting the node and a respective average time spent by users at the respective node;

logic executed by the processor for calculating respective prize score for each node of the plurality of nodes;

logic executed by the processor for selecting a first node of the plurality of nodes that is nearest to the starting location;

logic executed by the processor for selecting a second node of the plurality of nodes that is nearest to the ending location;

logic executed by the processor for determining a travel itinerary using the travel graph and the respective prize scores for each of the plurality of nodes, such that the travel itinerary comprises the first node of the plurality of nodes, the second node of the plurality of nodes and a plurality of additional nodes selected from the plurality of nodes, where the plurality of additional nodes are selected from the plurality of nodes such that a total prize score for the plurality of additional nodes is maximized within the time constraint; and communicating a representation of the travel itinerary to the user device.

20. A computing device comprising:

a processor;

a storage medium for tangibly storing thereon program logic for execution by the processor, the program logic comprising:

logic executed by the processor for retrieving point-of-interest data relating to a plurality of points of interest within a geographic area, the point-of-interest data comprising, for each point-of-interest of the plurality of points of interest, a respective popularity score and a respective location;

logic executed by the processor for retrieving geo-tagged data comprising a plurality of geo-tagged objects, each geo-tagged object of the plurality of geo-tagged objects relating to a respective one point-of-interest of the plurality of points of interest and comprising a respective date and time and a respective one user of a plurality of users;

logic executed by the processor for determining using the geo-tagged data, for each point-of-interest of the plurality of points of interest, a respective average time spent by the plurality of users at the respective point-of-interest;

logic executed by the processor for determining a plurality of travel times, each respective travel time of the plurality of travel times comprising a travel time between a respective first one point-of-interest of the plurality of points-of-interest and a respective second one point-of-interest of the plurality of points-of-interest; and logic executed by the processor for creating a travel graph for the geographical location based on the point-of-interest data, the respective average time spent by the plurality of users at each respective point-of-interest and the plurality of travel times, such that the travel graph comprises a plurality of nodes, each respective node corresponding to a respective one point-of-interest of the plurality of points of interest, where each respective node of the plurality of nodes is associated with respective node level data, comprising a respective location, a plurality of travel times between the respective node and at least a subset of the plurality of nodes, a respective popularity score for the node, a respective number of users visiting the node and a respective average time spent by users at the respective node.

* * * * *